No. 615,317. Patented Dec. 6, 1898.
B. F. SPRY.
HORSESHOE.
(Application filed Feb. 23, 1898.)
(No Model.)
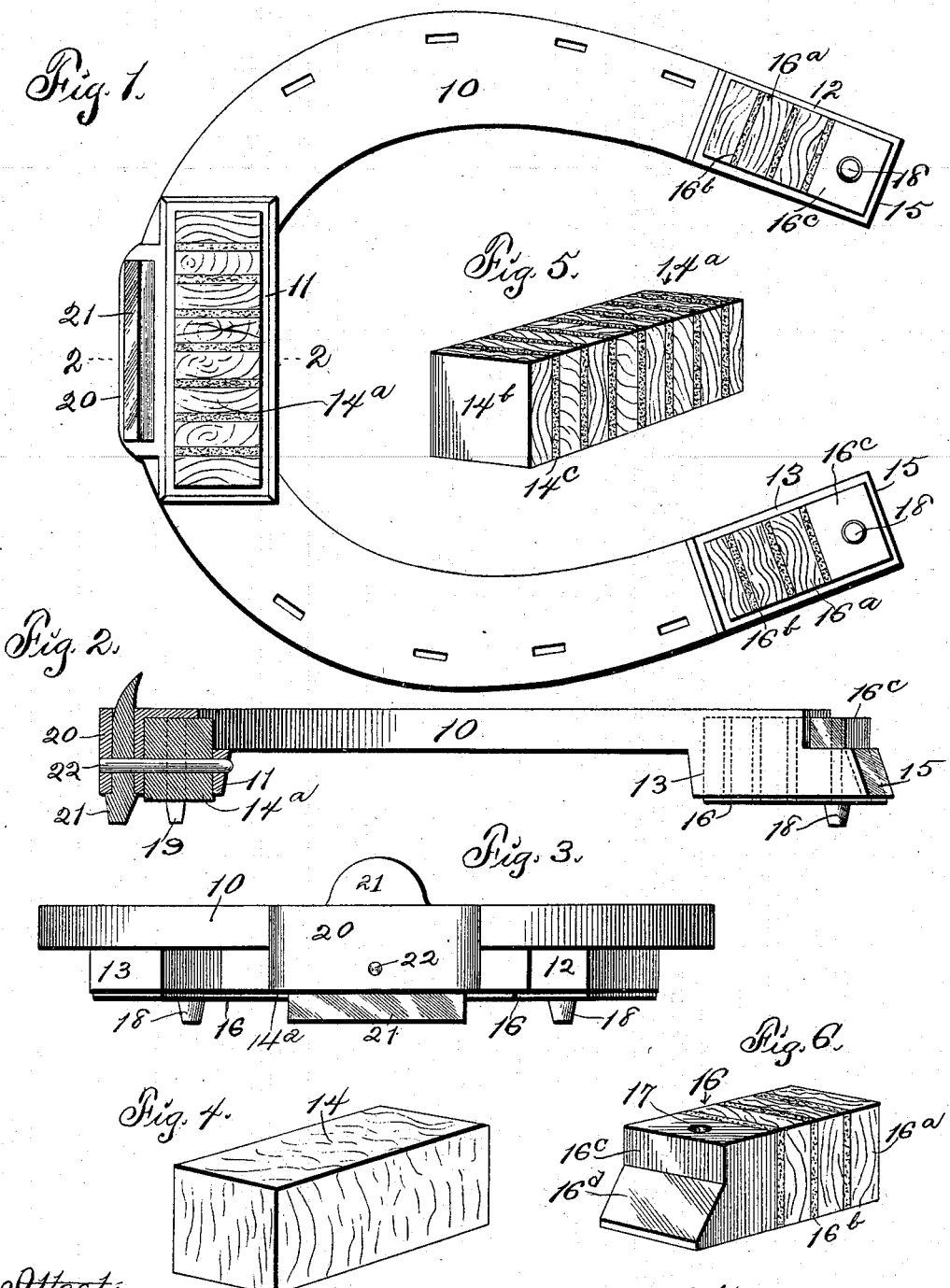

UNITED STATES PATENT OFFICE.

BENJAMIN F. SPRY, OF DES MOINES, IOWA.

HORSESHOE.

SPECIFICATION forming part of Letters Patent No. 615,317, dated December 6, 1898.

Application filed February 23, 1898. Serial No. 671,355. (No model.)

*To all whom it may concern:*

Be it known that I, BENJAMIN F. SPRY, a citizen of the United States of America, and a resident of Des Moines, county of Polk, State of Iowa, have invented certain new and useful Improvements in Horseshoes, of which the following is a specification.

The object of this invention is to provide improved means for shoeing a horse or other draft-animal.

This invention consists in a shoe formed with sockets arranged to receive calks composed of different materials—as, for instance, steel, wood, wood and leather, wood, leather, and Babbitt metal, or packed natural composition, such as clay, gravel, or similar materials.

The horseshoe herein described comprises, essentially, a horseshoe bar or plate, with means for attaching the same to the hoof of a horse, a toe-socket of considerable dimension to receive a calk, preferably made of wood or wood and other materials combined, and heel-calks, preferably made of wood or wood and other materials combined. The calks may be omitted from the sockets when driving upon dirt roads, and said sockets will fill and pack with clay, gravel, and soil picked up from the road by the impact thereof with the tread-surface, thereby forming a calk of natural composition within the sockets.

My invention further comprises the mounting of steel or metal calks or slugs in the composite calks when it is desired to provide an unyielding non-elastic tread for the horseshoe and a tread that is especially "sharp" to prevent slipping of the shoe on a tread-surface.

My invention further encompasses the construction of an auxiliary socket arranged to receive an auxiliary metallic (preferably steel) toe-calk wherewith to supplement the use and effectiveness of the ordinary calks.

My invention consists, further, in so forming and constructing the ordinary calks and using such material that said calks will pick up and accumulate on the tread-surface thereof gravel, pebbles, and other hard substances, which become embedded therein and form a sharp engaging surface thereon.

My invention consists, further, in the construction, arrangement, and combination of elements hereinafter set forth, pointed out in my claims, and illustrated by the accompanying drawings, in which—

Figure 1 is an inverted plan of the complete shoe. Fig. 2 is a vertical section of the shoe on the indicated line 2 2 of Fig. 1. Fig. 3 is a front elevation of the complete shoe. Fig. 4 is a detail perspective of one of the wooden calks. Fig. 5 is a detail perspective of a composite toe-calk. Fig. 6 is a detail perspective of a composite heel-calk.

In the construction of the shoe as shown the numeral 10 designates a horseshoe bar or plate preferably formed and constructed of malleable cast-iron, with a toe-socket 11 and heel-sockets 12 13 cast thereon and integral therewith. The toe-socket 11 has its greatest dimension or length transversely of the toe portion of the bar or plate 10 and is formed partially in said bar and partially by flanges downwardly extending from the bar, the rear transverse flange forming a chord across the forward end portion of the shoe-bar and providing an opening within the concave surface of said bar. The toe-calk 14 or $14^a$ is mounted in the toe-socket 11 and has its upper end in contact with the lower surface of the portion of the shoe-plate 10 within said toe-socket, the rear upper corner of said calk projecting throughout the intermediate portion thereof between the upper edge of the rear flange of the socket and the shoe-plate, whereby said calk may be engaged and driven from the socket when the shoe-bar is detached from the hoof of the horse. The toe-calk 14 is formed of a block of hard wood and is so shaped and positioned in the toe-socket that the grain of the calk is vertical. The toe-calk $14^a$ is formed of sections of wood $14^b$, alternated with sections or slabs of leather $14^c$, and is so shaped and mounted in the toe-socket 11 that the grain of the wood is vertical. The calks 14 and $14^a$ are so mounted in the toe-socket as to project slightly beyond the lower margins of the flanges of said socket, as particularly shown in Fig. 2. The heel-sockets 12 13 are formed with inclined rear walls 15, projecting beyond the extremities of the shoe-plate 10, an aperture or opening being formed within and between the rear walls and the extremities of the shoe-plate. Heel-calks 16, Fig. 6, are constructed of wood in single blocks, such as is shown in Fig. 4, or of sections of hard wood $16^a$, alternated with slabs or sections of leather $16^b$ and supplemented by a section $16^c$ of metal. The heel-calks are mounted in the heel-sockets, as illustrated in Figs. 1, 2, and 3, with the metallic portion $16^c$, if such be employed, protruding partially through the spaces or openings between the rear walls 15 and the extremities of the shoe-plate 10, whereby said calks may be driven or extracted from the heel-sockets at the will of the operator or user. The heel-calks are provided with tongue portions $16^d$, formed with chamfered or beveled upper faces to engage the inner faces of the rear walls 15 of the heel-sockets and limit and determine the upward movement of the rear portions of the heel-calks supplementary to the engagement of said heel-calks with the shoe-plate. The heel-sockets also are formed partially within the plate 10 and partially within the flanges downwardly extending from said plate. The heel-calks 16 are formed with apertures 17 vertically thereof and communicating with the open space between the extremities of the shoe-plate and the rear walls of the heel-sockets, within which apertures supplementary steel calks 18 may be positioned, if desired. The supplementary heel-calks 18 are shouldered at their lower ends, as illustrated by dotted lines in Fig. 2, to limit and determine the upward movement of said calks within and through the composite calks 16. Either of the toe or heel calks, when formed of wood or formed of a composite of wood and leather or similar substances, may be supplied with metallic calks 19 by driving slugs, nails, or specially-prepared calks of metal within the substance of wood or composite calks. The wooden or composite calks will pick up and retain by impact therewith and with the tread-surface pebbles, grit, and flinty substances, which become embedded in the tread-surfaces of the calks and form a hard and sharp surface therefor and thereon.

A supplementary socket 20 is formed on the shoe in front of the toe-socket 11, and in the drawings I have illustrated this supplementary socket as containing a metallic toe-calk 21, shouldered in its lower portion to limit and determine the movement thereof vertically through the socket 20, and extending in its upper portion above said socket, and bent rearwardly for engagement with the toe of the hoof to prevent slipping of the shoe on said hoof. The calk 21 may be used or not, as desired.

In Figs. 2 and 3 of the drawings I have illustrated the toe-sockets and toe-calks horizontally apertured to receive a pin or nail 22, whereby rigidly and firmly to secure said calks in the sockets; but it is believed that such structure is unnecessary and not essential to the satisfactory operation and use of the horseshoe, it being thought that the calks may be driven within the sockets and fit so snugly therein as to be retained by frictional engagement.

I claim as my invention—

1. A horseshoe comprising a plate or bar, the separate and independent toe and heel sockets formed on said bar and so shaped and arranged as to receive calks downwardly projecting from said bar, which calks comprise alternate sections of wood and leather, the wooden sections being arranged with the grain vertical.

2. The horseshoe comprising a bar or plate and toe and heel sockets integrally formed thereon and apertured in their inner portions whereby access may be had to the tops of said sockets.

3. The horseshoe comprising the bar or plate, sockets formed partially within the bar or plate and partially within flanges cast on said bar or plate, and calks mounted within said sockets.

4. The horseshoe comprising the bar or plate, the main toe-socket 11 integral with said bar or plate, the heel-sockets integral with said bar or plate, calks in said sockets, a supplementary toe-socket of less dimension than the toe-socket 11, and a supplementary toe-calk 21 mounted in said supplementary toe-socket.

5. The combination with the horseshoe, of wooden calks, and means for securing said calks to said shoe, the grain of the calks being approximately vertical, the means for securing the calks to the shoe comprising flanges on the shoe and a pin transversely seated in the flanges and the calk.

6. A shoe having a socket with an inclined rear wall, a calk seated in said socket and constructed of alternate sections of wood and leather and terminating in a section of metal at its rear end, which section of metal is formed with an inclined rear wall engaging the inclined rear wall of the socket and vertically apertured to receive a pin-calk.

7. A shoe formed with heel-sockets having inclined rear walls spaced apart from the rear ends of the shoe-plate, heel-calks mounted in said sockets and constructed with metal portions having inclined rear walls engaging the inclined rear walls of the sockets and centrally apertured to receive pin-calks.

8. The combination with a horseshoe, of calks formed partially of wood, partially of leather and partially of metal, and means for securing said calks to the shoe, the grain of the wooden portions of said calks being approximately vertical.

9. In a horseshoe, a plate with sockets formed thereon at the toe and heel thereof, the heel-sockets projecting rearwardly beyond the extremities of the plate and formed with inclined rear walls spaced apart from and forming an opening with the extremities of the plate.

10. In a horseshoe, the plate, the toe-socket, the supplemental toe-socket and the supplemental toe-calk mounted therein and projecting therethrough at both ends.

Signed by me, at Des Moines, Iowa, this 18th day of February, 1898.

BENJAMIN F. SPRY.

Witnesses:
S. C. SWEET,
THOMAS G. ORWIG.